(12) United States Patent
Akula et al.

(10) Patent No.: US 8,139,755 B2
(45) Date of Patent: Mar. 20, 2012

(54) SYSTEM AND METHOD FOR THE AUTOMATIC SELECTION OF INTERFACES

(75) Inventors: Vasudeva Rao Akula, Ashburn, VA (US); Sunil Issar, Ashburn, VA (US)

(73) Assignee: Convergys CMG Utah, Inc., Salt Lake City, UT (US)

( * ) Notice: Subject to any disclaimer, the term of this patent is extended or adjusted under 35 U.S.C. 154(b) by 1000 days.

(21) Appl. No.: 12/055,712

(22) Filed: Mar. 26, 2008

(65) Prior Publication Data

US 2008/0240406 A1    Oct. 2, 2008

Related U.S. Application Data

(60) Provisional application No. 60/908,310, filed on Mar. 27, 2007.

(51) Int. Cl.
*H04M 3/00* (2006.01)
(52) U.S. Cl. ............. 379/265.09; 379/88.17; 379/88.18; 379/93.05; 379/265.01; 379/265.02; 715/771
(58) Field of Classification Search ............... 379/88.18, 379/32.01, 265.08, 265.09; 709/270.1
See application file for complete search history.

(56) References Cited

U.S. PATENT DOCUMENTS

| | | | |
|---|---|---|---|
| 5,243,643 A | 9/1993 | Sattar et al. | |
| 5,479,487 A | 12/1995 | Hammond | |
| 5,822,404 A | 10/1998 | Cave | |
| 6,038,293 A * | 3/2000 | McNerney et al. | ........ 379/88.19 |
| 6,061,433 A | 5/2000 | Polcyn et al. | |
| 6,075,843 A | 6/2000 | Cave | |
| 6,246,989 B1 | 6/2001 | Polcyn | |
| 6,314,178 B1 * | 11/2001 | Walker et al. | ............ 379/266.01 |
| 6,377,662 B1 | 4/2002 | Hunt et al. | |
| 6,385,304 B1 | 5/2002 | Hunt et al. | |
| 6,427,002 B2 | 7/2002 | Campbell et al. | |
| 6,430,285 B1 | 8/2002 | Bauer et al. | |
| 6,584,180 B2 | 6/2003 | Nemoto | |
| 6,704,707 B2 | 3/2004 | Anderson et al. | |
| 6,714,631 B1 | 3/2004 | Martin et al. | |
| 6,728,671 B1 | 4/2004 | Johnson | |
| 6,747,975 B1 | 6/2004 | Howell | |
| 6,778,640 B1 | 8/2004 | Zhang et al. | |
| 6,792,096 B2 | 9/2004 | Martin et al. | |
| 6,823,054 B1 | 11/2004 | Suhm et al. | |
| 6,873,686 B1 | 3/2005 | Zhang et al. | |
| 7,050,560 B2 | 5/2006 | Martin et al. | |
| 7,062,018 B2 | 6/2006 | Martin et al. | |
| 7,076,427 B2 | 7/2006 | Scarano et al. | |
| 7,082,392 B1 | 7/2006 | Butler et al. | |
| 7,136,476 B2 | 11/2006 | Martin et al. | |
| 7,143,039 B1 | 11/2006 | Stifelman et al. | |
| 7,426,268 B2 * | 9/2008 | Walker et al. | ............ 379/266.01 |
| 7,436,948 B1 * | 10/2008 | Thenthiruperai | ........ 379/266.03 |

(Continued)

OTHER PUBLICATIONS

Office Action dated Nov. 29, 2010 for U.S. Appl. No. 11/208,028.

(Continued)

*Primary Examiner* — Joseph J Nguyen
(74) *Attorney, Agent, or Firm* — Frost Brown Todd LLC; William S. Morriss

(57) ABSTRACT

The automatic selection of interfaces can result in the optimization of interaction between entities. Such selection of interfaces can be applied specifically in the context of interactive voice response systems, and can allow the interface presented to a caller to be optimized based on factors including the caller's usage of the system.

19 Claims, 1 Drawing Sheet

U.S. PATENT DOCUMENTS

| | | | |
|---|---|---|---|
| 2001/0047261 A1 | 11/2001 | Kassan | |
| 2004/0122941 A1 | 6/2004 | Creamer et al. | |
| 2004/0161094 A1 | 8/2004 | Martin et al. | |
| 2005/0081152 A1* | 4/2005 | Commarford et al. | 715/705 |
| 2005/0169440 A1 | 8/2005 | Agapi et al. | |
| 2005/0201526 A1* | 9/2005 | Bittner | 379/32.01 |
| 2006/0009867 A1* | 1/2006 | Leban et al. | 700/94 |
| 2006/0072739 A1* | 4/2006 | Baggenstoss et al. | 379/265.05 |
| 2006/0115070 A1* | 6/2006 | Bushey et al. | 379/265.02 |
| 2006/0146992 A1* | 7/2006 | Paden et al. | 379/88.01 |
| 2006/0193449 A1 | 8/2006 | Martin et al. | |
| 2006/0200348 A1 | 9/2006 | Knott et al. | |
| 2007/0043569 A1 | 2/2007 | Potter et al. | |
| 2007/0043571 A1* | 2/2007 | Michelini et al. | 704/270.1 |
| 2007/0044023 A1 | 2/2007 | Carter et al. | |
| 2007/0165808 A1* | 7/2007 | Pieraccini et al. | 379/142.04 |
| 2007/0184857 A1 | 8/2007 | Pollock et al. | |
| 2007/0203987 A1 | 8/2007 | Amis | |
| 2008/0240378 A1 | 10/2008 | Pollock et al. | |

OTHER PUBLICATIONS

Office Action dated Feb. 28, 2011 for U.S. Appl. No. 11/349,051.
Office Action dated Mar. 1, 2011 for U.S. Appl. No. 11/361,305.
Office Action issued against U.S. Appl. No. 11/207,609, dated May 22, 2007.
Final Office Action issued against U.S. Appl. No. 11/207,609 dated Oct. 17, 2007.
Office Action issued against U.S. Appl. No. 11/207,609 dated Feb. 19, 2009.
Office Action issued against U.S. Appl. No. 11/207,609 dated Jul. 21, 2009.
Office Action issued against U.S. Appl. No. 11/207,609 dated Mar. 2, 2010.
Office Action issued against U.S. Appl. No. 11/208,028 dated Jan. 30, 2009.
Final Office Action issued against U.S. Appl. No. 11/208,028 dated Jun. 23, 2009.
Office Action issued against U.S. Appl. No. 11/208,028 dated Oct. 26, 2009.
Final Office Action issued against U.S. Appl. No. 11/208,028 dated Mar. 15, 2010.
Office Action issued against U.S. Appl. No. 11/361,305 dated Jun. 24, 2009.
Final Office Action issued against U.S. Appl. No. 11/361,305 dated Nov. 6, 2009.
Office Action issued against U.S. Appl. No. 11/349,051 dated Oct. 28, 2008.
Final Office Action issued against U.S. Appl. No. 11/349,051 dated Apr. 7, 2009.
Office Action issued against U.S. Appl. No. 11/349,051 dated Sep. 16, 2009.
Final Office Action issued against U.S. Appl. No. 11/349,051 dated Mar. 4, 2010.
Office Action issued against U.S. Appl. No. 11/349,051 dated Oct. 6, 2010.
Office Action issued against U.S. Appl. No. 11/361,305 dated Oct. 28, 2010.
Office Action dated Jun. 22, 2011 for U.S. Appl. No. 11/691,127.

* cited by examiner

SYSTEM AND METHOD FOR THE AUTOMATIC SELECTION OF INTERFACES

PRIORITY

This applications claims priority from the disclosure of U.S. Provisional Patent Application Ser. No. 60/908,310, having the same title, filed on Mar. 27, 2007, which is incorporated by reference herein.

FIELD OF THE INVENTION

This invention is in the field of automatic real time optimization of interactions during communication with an automated system.

BACKGROUND

While it is well known that automation can help decrease labor costs, there are many barriers to the full adoption of automation which prevent automation technology from reaching its full potential. One such barrier is the potential difficulty presented by interacting with an automated system. For example, even if an automated system has a well defined and known interface, interaction with the system through that interface might be complicated by factors such as differences in the caller's familiarity with the interface. In some cases, interaction with an automated system would be facilitated through the use of an alternate interface to accommodate more efficient information transfer than would be possible with the current interface provided by the automated system. However, even when alternate interfaces are available, accessing those interfaces might be inefficient or inconvenient. For example, the use of a particular interface might be reliant on a user knowing that an alternate interface exists, and/or on making an explicit request to use that interface. The teachings of this application can be used to automatically select interfaces, thereby facilitating interaction with automated systems, and lowering the barriers to adoption and acceptance of automated technology.

SUMMARY

The teachings of this application can be implemented in a variety of systems, methods, computer readable media, apparatuses and other embodiments as might be appropriate for particular situations. As an example, certain aspects of the teachings of this application could be implemented in a computer readable medium having stored thereon computer executable instructions for selecting an interface presented to a caller during an interaction between the caller and an interactive voice response system, or other interface-based systems, such as a multimodal interface system.

For the purpose of clarity, certain terms used in the description herein should be understood to have specific meanings in the technological context of this application. In that light, the term "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. The term "computer executable instructions" should be understood to refer to data which can be used to specify physical or logical operations which can be performed by a computer. The term "computer" should be understood to refer to any device or group of devices which is capable of performing one or more logical and/or physical operations on data to produce a result. The term "data" should be understood to refer to information which is represented in a form which is capable of being processed, stored and/or transmitted. The term "interaction" should be understood to refer to the exchange of information between two or more entities. The term "interface" should be understood to refer to a set of commands, formats, specifications and tools which are used by an entity presenting the interface to send and receive information. The term "interactive voice response system" (abbreviated IVR) should be used to refer to a system which interacts with callers by providing prompts and accepting input in the form of natural language responses and/or touchtone keypad selections. The term "multimodal interface system" should be used to refer to a system which is capable of interaction using visual, touch, and/or voice interfaces. The term "visual interface" should be used to refer to any interface presenting information to a receiving entity in a visual form. By way of example only, and not limitation, a visual interface may present information by using a display, such as the display on a mobile phone device. The term "touch interface" should be used to refer to any interface presenting information to a receiving entity in a tactile form. By way of example only, and not limitation, a touch interface may present information using a touch-screen capable of receiving multi-touch responses. The term "voice interface" should be used to refer to any interface presenting information to a receiving entity in an audible form. By way of example only, and not limitation, a computerized voice interface would be one example of a voice interface.

In an implementation in which a computer readable medium stores computer executable instructions for selecting an interface presented to a caller during an interaction between the caller and an interactive voice response system, the computer executable instructions might comprise: a usage detection module, which determines a user level for the caller by comparing the interaction with one or more previous interactions, and an interface selection engine, operable during the interaction to automatically switch the interface presented to the caller to one of a plurality of available interfaces based on the current user level.

For the purpose of clarity, certain terms used herein should be understood as having a particular meaning in the technical context of this application. In that vein, the verb "determine" (and various forms thereof) should be understood to refer to the act of generating, selecting or otherwise specifying something. For example, to obtain an output as the result of analysis would be an example of "determining" that output. As a second example, to choose a response from a list of possible responses would be a method of "determining" a response. Also, the term "previous interaction," when used in the context of comparing an interaction between a caller and an IVR with a "previous interaction" should be understood to refer to an interaction which took place at a time preceding the interaction to which it is being compared. Further, it should be understood that the "previous interaction" might be an interaction between the IVR and the same caller as is engaging in the interaction to which the "previous interaction" is being compared, or it might be an interaction between the IVR and some different caller. Additionally, the term "module" should be understood to refer to a set of one or more instructions which, when executed by a computer, result in that computer performing a specified task. The term "set" should be understood to refer to a number, group, or combination of one or more things of similar nature, design, or function. The phrase "during the interaction" should be understood as being used as a modifier indicating a time in which an interaction is ongoing. For example, if an interaction starts with a person saying "Hello", and ends with that person saying "Goodbye", anything which takes place between and including the words "Hello" and "Goodbye" could be said to have taken place "during the interaction." The modifier "automatically" should be understood to be used to indicate that the act which takes place "automatically" occurs as the result of the operation of a device (e.g., a computer). For example, an act (such as an interface switch), which takes place as a result of a computer's analysis of data gathered during an interaction could be said to have taken place "automatically."

In some implementations in which a usage detection module determines a user level for a caller by comparing an interaction with one or more previous interactions, that comparison might be made in terms of: total time taken to reach a specified dialog during the interaction; time spent on one or more individual dialogs within a call script; and, total number of failures, wherein a failure comprises an act taken from the list consisting of the caller not providing input to an interactive voice response system, and the caller providing an incorrect input to an interactive voice response system.

For the purpose of clarity, certain terms used herein should be understood to have specific meanings in the technical context of this application. Thus, the "total time taken to reach a specified dialog" should be understood to refer to the time elapsed during an interaction before the prompt of the specified dialog is presented to the caller. The phrase "providing an incorrect input to the interactive voice response system" should be understood to refer to providing an input which is not expected and/or recognized by the interactive voice response system's interface. For example, if an interactive voice response system provides the prompt "say 1 for weather or 2 for news" and expects a response of "1", "2", or "Operator", and the caller responds by stating "Woozle", it could be said that the caller made an "incorrect response."

As an additional example of how certain aspects of this application could be implemented by one of ordinary skill in the art, in an implementation in which an interface selection engine is operable to switch an interface to one of a plurality of available interfaces, the available interfaces might comprise: a standard interface, a specialized interface, and a robust interface.

For the purpose of clarity, certain terms used herein should be understood to have specific meanings in the technical context of this application. Thus, the term "standard interface" should be understood to refer to a default interface used for the system. By way of example only, and not limitation, a standard interface may include a normal speech interface used by an IVR system. The term "specialized interface" should be understood to refer to an interface having features suitable for advanced users. By way of example only, and not limitation, a specialized interface may include an advanced speech interface used by an IVR system, where the advanced speech interface contains less explanatory information than a normal speech interface. The term "robust interface" should be understood to refer to an interface having less propensity for interpretive error in receiving responses. By way of example only, and not limitation, a robust interface may include a touchtone interface used by an IVR system. While the above examples have involved speech interfaces for standard and specialized interfaces, and a touchtone interface for a robust interface, it should be appreciated that speech interfaces or touchtone interfaces may be adapted to fit the definitional parameters of a standard interface, a specialized interface, or a robust interface. Thus, standard and specialized interfaces should not be limited to speech interfaces, nor should robust interfaces be limited to touchtone interfaces. Furthermore, in the context of multimodal interfaces, visual interfaces may also be designed as either standard, specialized, or robust interfaces.

Additionally, it should be understood that this application is not limited to being implemented as described above. The inventors contemplate that the teachings of this application could be implemented in a variety of methods, data structures, interfaces, computer readable media, and other forms which might be appropriate to a given situation. Additionally, the discussion above is not intended to be an exhaustive recitation of all potential implementations of this application.

BRIEF DESCRIPTION OF THE DRAWING

The accompanying drawing is incorporated in and constitutes a part of this specification. Together with the detailed description given below, the drawing serves to explain how the teachings of this application could be implemented. It should be understood that the teachings of this application are not limited to being implemented in the precise arrangements shown. In the drawing:

DETAILED DESCRIPTION

Figure 1:
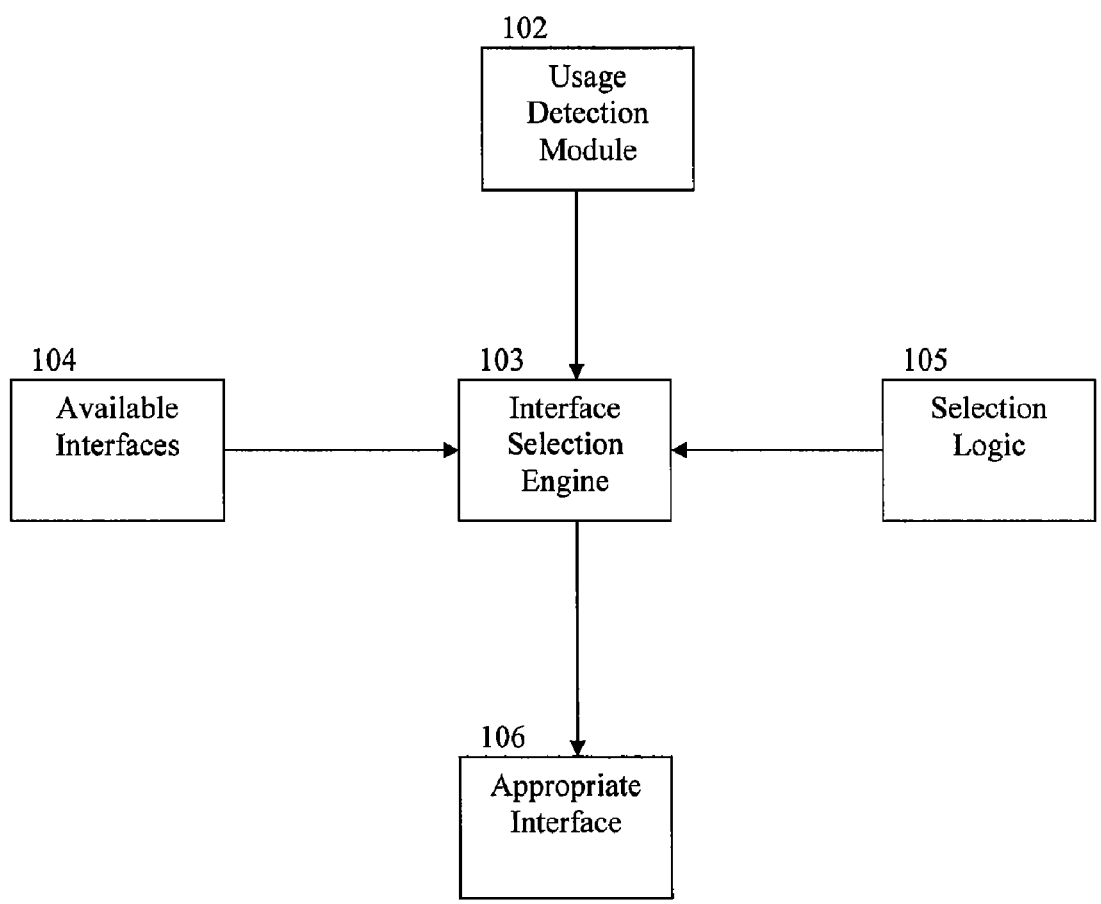
FIG. 1 depicts a high level diagram of components which could be used to determine and switch to an appropriate interface in an interaction with an automated system.

The examples and explanations set forth herein are intended to enable one of ordinary skill in the art to implement the teachings of this application without undue experimentation. It should be understood that the examples and terminology used in this application are intended to be illustrative only, and should not be interpreted as limiting on the scope of any claims which claim the benefit of this application, either through a priority claim or other means.

It should further be understood that while the examples and explanations set forth herein focus on interactive voice response systems, the examples and explanations herein are equally applicable to other interface-based systems used for interactions. By way of example only, and not limitation, such other systems may include multimodal interface systems.

EXAMPLE 1

As an illustration of how automated interface selection can facilitate interaction with an automated system, consider the example of a caller interacting with an interactive voice response system (IVR). For the purpose of this example, assume that the caller calls the IVR and that, once a connection has been established, the ensuing communication is comprised of a plurality of dialogs, which themselves consist of a prompt from the IVR (e.g., "Please state your name") and a response from the caller (e.g., "John Doe"). In this example, the dialogs initially take place using a standard interface, comprising explanatory prompts provided by the IVR, and speech recognition software for interpreting responses provided by the caller. Also, for the purpose of this example, assume that the standard interface is inappropriate for interaction with the caller. This inappropriateness could result from a plurality of causes.

Consider a caller who is familiar with the functions provided by the IVR, thereby rendering the explanatory prompts provided by the standard interface unnecessary and/or inefficient. For such an individual, interaction with the IVR could be made more efficient by switching to a specialized interface more appropriate to the caller's usage of the IVR. To make the determination of whether such a switch might be appropriate, the IVR could be equipped with a usage detection module.

This usage detection module might function in a variety of ways. The usage detection module might make its determination by measuring the total time required by the caller to reach a given point, or marker, in the interaction with the IVR (e.g., the total time required by the caller to navigate an introductory menu and reach a dialog requesting the caller to enter a personal identification number) and compare that time with an average time taken by other callers to reach that point, or marker, in similar interactions. Alternatively, the usage detection module might monitor the number of caller input failures (e.g., providing no inputs within a given time, or providing an input which does not match the choices available as responses for a given dialog) and use a comparison of that number with the number of input failures of other callers in similar interactions to determine the appropriateness of switching the caller to a specialized interface. As yet another alternative, the usage detection module might measure the time the caller spends at each individual dialog in the interaction (e.g., the time spent by the caller in responding to a personal identification number request in an interaction with a banking IVR) and compare that measurement with the average time spent by other callers.

Still other alternatives for determining the appropriateness of an interface switch in the context of the usage detection module may include comparing a caller with preset benchmarks or thresholds, instead of with data regarding interactions with other callers. By way of example only, and not limitation, one such benchmark or threshold may include a caller providing hidden, unspecified commands or options to the IVR system. For instance, a high usage level may be evidenced by a caller interrupting the IVR by speaking or entering an account number before the IVR system has requested such information. Similarly, a high usage level may be evidenced by a caller interrupting the IVR by speaking or entering a menu navigation option before it has been presented to the caller as an option. Also, by way of example only, and not limitation, one such benchmark or threshold may include a caller using terse responses within an IVR system when terse responses are not required. It will be apparent to those of ordinary skill in the art that callers familiar with an IVR often provide concise and accurate response terms rather than providing a verbose response. For instance, a high usage level may be evidenced by a caller responding "transfer $400 from savings" to an IVR prompt inquiring, "What would you like to do?"

Regardless of the specific methods employed, once the usage detection module determines that the switch is appropriate, the caller could be automatically switched to a specialized interface (e.g., an advanced interface which omits some of the explanatory material provided by the prompts of the standard interface) in real time during the interaction.

EXAMPLE 2

As a concrete example of how a switch to a specialized interface might take place, consider the following example of a series of dialogs which might take place with a banking IVR to transfer money from one account to another. Using a standard interface, a communication comprising the following prompts and responses might take place:

Prompt: "Welcome to XYZ national bank's telephonic banking system. To access the system, please state your personal identification number."
Response: "123-456-789"
Prompt: "Please state the type of transaction you wish to perform."
Response: "I want to transfer money."
Prompt: "Please state the amount you wish to transfer"
Response: "$500"
Prompt: "Please state the account number of the account you wish to transfer from."
Response: "0987"
Prompt: "Please state the account number of the account you wish to transfer to."
Response: "4321"
Prompt: "Do you wish to transfer $500 from account 0987 to account 4321?"
Response: "Yes"
Prompt: "Your request is being processed. Your confirmation number for this transaction is 6754."
Response: <Caller hangs up>.

However, if a usage detection module detects that the caller was already familiar with the operation of the IVR (for example, because the caller stated his PIN number as soon as a connection to the IVR was established), the caller could be switched to a specialized interface, which might result in the following series of prompts and responses:
Prompt: "Wel—"
Response: <Caller interrupts midway through the word welcome> "123-456-789"
Prompt: "Please state your transaction."
Response: "Transfer $500 from 0987 to 4321."
Prompt: "Do you wish to transfer $500 from account 0987 to account 4321?"
Response: "Yes"
Prompt: "Your request is being processed. Your confirmation number for this transaction is 6754."
Response: <Caller hangs up>.

Thus, by switching to an interface which includes less explanatory material and instead relies on the caller's familiarity with the system, a usage detection module allows for a more efficient transaction to take place. Of course, this example is provided only to illustrate one potential application for a usage detection module, and is not intended to be limiting on either the analysis performed by usage detections modules, or the types of specialized interfaces they may employ.

It should be appreciated that the methods employed for detecting the appropriateness of an interface change, selecting an available interface, and switching to the selected interface may be used in a variety of ways. For example, the usage detection module may be configured to analyze specific dialogs or portions of dialogs to provide an output for determining whether an interface change is appropriate. Alternatively, the detection module may be configured to analyze the interaction in different increments, possibly based on multiple dialogs, time, or caller usage behavior patterns. Additionally, such a system may be configured to allow for any number of interface changes during a given interaction. While in some versions there may be only one interface switch, in other versions there may be numerous interface switches. Similarly, among the available interfaces, the same interface may be used any number of times during a given interaction.

Also, the discussion of the usage detection module in the previous paragraphs should be understood as illustrative only of how automated interface selection could be used to facilitate interaction with an automated system, and should not be interpreted as limiting on the scope of the claims which claim the benefit of this application. For example, while the previous paragraphs described methods in which the usage detection module could determine the appropriateness of an interface switch as alternatives, those methods could be used in combination with each other, or with other methods, or be replaced by other methods entirely. Similarly, while the previous paragraphs described an interface switch being made automatically as a result of the determination of the usage detection module, in some instance, the analysis of the usage detection module might be used as an input to another process which would make the determination of whether to perform an interface switch. By way of example only, and not limitation, other processes to which the usage detection module might be used as an input may include a process that segments callers into different usage levels based on transaction type or call circumstances. For instance, it may be impractical to switch a caller from a speech interface to touchtone interface if the caller is driving and on a cellphone, or if the caller uses a smartphone device which may not have usual keypads. Similarly, it may be impractical to switch a caller from a normal speech interface to an advanced speech interface, if the caller will be executing a new, unfamiliar transaction type compared to when the caller is executing familiar transaction types. Also, while the focus has included automatically switching interfaces, in some instances a switch could be made at the request of a caller or a system administrator. These and other variations on the use of interface switching could be used to facilitate interaction with automated systems by those of skill in the art without undue experimentation.

EXAMPLE 3

By way of additional illustration, FIG. 1 sets forth a high level diagram showing one manner in which a system for automatically switching an interface, as described above in the context of an interaction with an IVR, could be implemented. In the system shown in FIG. 1, a usage detection module [102] is communicatively coupled with an interface selection engine [103], which could be implemented as a software module capable of choosing among available interfaces [104] according to selection logic [105] to determine an appropriate interface [106] for interaction with the IVR. As a simplified example of how the components depicted in FIG. 1 might interact, consider the situation in which the usage detection module [102] has only one output, and in which that output can take only one of three states. For the usage detection module [102], that output might be a usage level, which could have the states of AVERAGE, BELOW AVERAGE and ADVANCED. Those outputs would be accepted by the interface selection engine [103], which would use the selection logic [105], to determine which of the available interfaces [104] is the appropriate interface [106]. To continue the simplified example, the interface selection engine [103] might use the following selection logic [105]:

$I=R$ iff $(U==1)$
$I=S_1$ iff $(U==2)$
$I=S_0$ iff $(U==0)$

Where, in the expressions above, "I" represents the appropriate interface [106], "R" represents a robust interface, "$S_1$" represents a specialized interface, "$S_0$" represents a standard interface, "iff" is a logical operator meaning if and only if, and U represents the output and state of the usage detection module [102] (with 0 meaning AVERAGE usage level, 1 meaning BELOW AVERAGE usage level, and 2 meaning ADVANCED usage level). When the appropriate interface [106] had been determined, the interface selection engine [103] could automatically implement the interface which is most appropriate for interaction with the caller. The interface could thereby be optimized without any specific request from the caller, and potentially without the caller realizing that a switch has taken place.

It should be understood that the simplified example discussed in the context of FIG. 1 is not intended to be limiting on the scope of claims which claim the benefit of this application. Indeed, the discussion of the components depicted in FIG. 1 was purposefully simplified to avoid distracting from the interactions of those components. Accordingly, while the discussion of FIG. 1 included a usage detection module [102] having one output, and that output having only one potential value, more complicated, and larger numbers of outputs could also be used for determining the appropriateness of a particular interface for an interaction. For example, instead of taking only three values, the outputs of the usage detection module [102] might take the form of more expressive or structured data (e.g., floating point numbers, or markup language files). Also, in some implementations, instead of using the three expressions set forth above to determine which of three available interfaces [104] to use, the interface selection engine [103] might have larger numbers of available interfaces [104] and use more complicated or sophisticated methods of deciding between them. For instance, the interface selection engine [103] might incorporate machine learning algorithms, such as neural network analysis, so that not only could interface selection be more sophisticated, it could also be modified to become more accurate over time. Similarly, machine learning techniques could be incorporated into the processing performed by the usage detection module [102] so that it too might adapt over time to provide more accurate inputs for the interface selection engine [103].

EXAMPLE 4

As an illustration of how an interface could be switched without the caller being aware that the switch has taken place, consider the following example. Using a standard interface, a banking IVR might provide the following prompt: "What would you like to do? You can say recent transactions, balance information or find a branch." If the caller responded with a terse response like "transfer $400 from savings," the IVR might be configured to recognize such a terse response as an indication of an advanced usage level and automatically switch to a specialized interface, such as an advanced speech interface with fewer prompts and/or less explanatory information. The next prompt in the standard interface may have been: "Which account would you like to transfer from?" Whereas, the next prompt in the specialized interface may be: "You would like to transfer $400 from savings to checking. Please confirm." Thus, by detecting an advanced usage level and switching to a specialized interface, the interaction may proceed with fewer steps and more expeditiously. Such transparent selection of appropriate interfaces could result in more effective communication with an automated system, thereby reducing the number of transfers to a live system.

EXAMPLE 5

In an example incorporating a multimodal interface system, the interaction may begin with a caller phoning an automated banking application. In this example, the automated banking application may be designed with an ATM locator utility that uses a multimodal interface system having voice, touchtone, and visual interfaces. Furthermore, the multimodal interface system may be responsive to usage level inputs to improve the interaction efficiency and experience for the caller.

Expanding on this example, an interaction in a multimodal system without an automatic interface switch based on user level may take the following form:

Prompt: "What would you like to do? You may say recent transactions, balance information, or find an ATM."
Response: "Find an ATM."
Prompt: "Please tell me the location where you want to find the ATM."
Response: "I am at 11800 Sunrise Valley Drive in Reston, Va."
Prompt: "There is an ATM at 1000 Reston Parkway, Reston, Va. Would you like directions from your current location?"
Response: "Yes."
Prompt: "Would you like directions sent to your cellphone?"
Response: "Yes."
Prompt: "Sending directions to your cellphone (703) 555-1212."
Response: <Caller hangs up>.

However, if a usage detection module detects that the caller was already familiar with the operation of the banking ATM locator utility (for example, because the caller stated his location as soon as a connection to the system was established), the caller could be switched to a multimodal interface system using a specialized speech interface, which might result in the following series of prompts and responses:

Prompt: "What—"
Response: <Caller interrupts midway through the word what> "11800 Sunrise Valley Drive in Reston, Va."
Prompt: "There is an ATM at 1000 Reston Parkway, Reston, Va. Would you like directions from your current location sent to your cellphone?"
Response: "Yes."
Prompt: "Sending directions to your cellphone (703) 555-1212."
Response: <Caller hangs up>.

Thus, by switching to an interface which includes less explanatory material and instead relies on the caller's familiarity with the system, a usage detection module allows for a more efficient transaction to take place. Of course, this example is provided only to illustrate one potential application for a usage detection module with a multimodal interface system, and is not intended to be limiting on either the analysis performed by usage detections modules, or the types of specialized interfaces they may employ.

While this application has focused on facilitating interaction with an IVR through the use of automated interface selection, such automated interface selection is not limited to the specific methods, systems, components and uses explicitly set forth in the description. For example, while FIG. 1 depicted available interfaces [104] and selection logic [105] as being distinct components, those components could be combined when implementing the teachings of this application (e.g., each available interface might be associated with a particular expression for triggering and/or a preference value for use in conflict resolution). Similarly, while FIG. 1 depicts the available interfaces [104] and selection logic [105] as separate from the interface selection engine [103], those components could be integrated into the interface selection engine [103], for example, by having their contents coded directly into the interface selection engine [103]. Further modifications might include augmentation or replacement of the inputs provided by the usage detection module [102] depicted in FIG. 1.

Similarly, modifications might augment or replace the usage detection modules with other components. For example, a security detection module (for determining whether an interface having increased security should be employed), a latency detection module (for determining whether the data transferred for a particular interface introduces greater delays than data which might be transferred using a different interface), a compatibility detection module (for determining whether an entity communicating with an automated system has capabilities which are compatible with a particular interface), and a caller preference detection module (for determining whether a caller prefers a particular interface for certain types of dialogs, e.g., a caller preferring to use a touchtone interface for secure dialog modules requesting personal numeric or alphanumeric information) could be used to determine whether a particular interface is more appropriate for a particular interaction.

Also, while the above discussion has focused on interactions between a caller and an IVR, the technique of selecting an appropriate interface for an interaction (or multiple appropriate interfaces for an interaction, in the circumstance where the determination of appropriate interface might change) can be broadly applied in any situation in which multiple interfaces of potentially varying efficacy are available. As discussed previously, and by way of example only and not limitation, other applicable situations may include multimodal interface systems.

The preceding paragraphs disclose certain features which might be present in some implementations of the techniques taught herein. The above disclosure is intended to be illustrative of certain features and capabilities which might be present in some implementations of systems which are capable of automated interface selection, it should be understood that numerous modifications and improvements will be immediately apparent to one of skill in the art. Therefore, the above disclosure should be taken as illustrative, and not limiting on the scope of any claims which claim the benefit of this application.

What is claimed is:

1. A non-transitory computer readable medium comprising computer executable instructions for selecting an interface presented to a caller during an interaction between the caller and an interactive voice response system, wherein the computer executable instructions comprise:
   (a) one or more detection modules operable to determine one or more outputs associated with the interaction, wherein at least one of the detection modules comprises a usage detection module operable to:
      i) determine whether the caller has a below average user level;
      ii) determine whether the caller has an average user level;
      iii) determine whether the caller has an advanced user level; and
      iv) output a user level value corresponding to the determined user level for the caller;
   (b) a selection logic operable to select one of a plurality of available interfaces; and
   (c) an interface selection engine in communication with the one or more detection modules and the selection logic, wherein the interface selection engine is operable to switch the interface presented to the caller to the one of the plurality of available interfaces based on the one or more outputs provided by the detection modules and the selection logic;

wherein:
(A) the selection logic is operable to repeatedly select one of the plurality of available interfaces at least once during the interaction;
(B) the interface selection engine is operable to repeatedly switch the interface presented to the caller to one of the plurality of available interfaces at least once during the interaction;
(C) initially switching the interface presented to the caller to one of the plurality of available interfaces comprises switching the interface presented to the caller from a first interface to a second interface;
(D) a repeated selection of one of the plurality of available interfaces comprises selecting a third interface from the plurality of available interfaces;
(E) a repeated switching the interface presented to the caller to one of the plurality of available interfaces comprises switching from the second interface to the third interface automatically during the interaction; and
(F) the first interface, the second interface and the third interface are each interfaces to the interactive voice response system.

2. The non-transitory computer readable medium of claim 1, wherein the one or more detection modules further comprise a security detection module, wherein the security detection module is operable to determine whether to employ an interface having increased security.

3. The non-transitory computer readable medium of claim 1, wherein the interface selection engine communicates with the one or more detection modules and the selection logic during the interaction and automatically switches the interface in real time to the one of the plurality of available interfaces.

4. The non-transitory computer readable medium of claim 1, wherein the user level is determined by comparing the time to reach a specified marker during the interaction, with the time to reach the specified marker during one or more previous interactions.

5. The non-transitory computer readable medium of claim 1, wherein the user level is determined by comparing the time spent on one or more dialogs within a call script during the interaction, with the time spent on one or more dialogs within the call script during one or more previous interactions.

6. The non-transitory computer readable medium of claim 1, wherein the user level is determined by comparing the number of failures during the interaction, with the number of failures during one or more previous interactions.

7. The non-transitory computer readable medium of claim 1, wherein the user level is determined by comparing the response of the caller to a benchmark.

8. The non-transitory computer readable medium of claim 7, wherein the benchmark involves the caller providing one or more unspecified commands.

9. The non-transitory computer readable medium of claim 7, wherein the benchmark involves the caller providing one or more terse responses.

10. The non-transitory computer readable medium of claim 1, wherein the user level is determined based on members selected from the group consisting of a time to reach a specified marker during the interaction, a time spent on one or more dialogs within a call script during the interaction, a number of failures during the interaction, one or more unspecified commands provided by the caller, one or more terse responses provided by the caller, and combinations thereof.

11. The non-transitory computer readable medium of claim 1, wherein the interaction is between a user and a multimodal interface system, wherein the multimodal interface system is operable to interact using at least one of visual, touch, or voice interfaces.

12. The non-transitory computer readable medium of claim 1 wherein:
a) the usage detection module has only one output;
b) the output of the usage detection module has only three states, the three states consisting of average, below average, and advanced;
c) the selection logic selects a robust interface if the output of the usage detection module is below average;
d) the selection logic selects a standard interface if the output of the usage detection module is average; and
e) the selection logic selects a specialized interface if the output of the usage detection module is advanced.

13. A system for automatically switching an interface associated with an interactive voice response system comprising:
(a) an interface selection engine;
(b) a selection logic; and
(c) a usage detection module, wherein the usage detection module produces one or more outputs relating to a caller's usage that are accepted by the interface selection engine, wherein the usage detection module comprises a user level output having an average user level state, a below average user level state, and an advanced user level state;
wherein the interface selection engine comprises a software module operable to select one of a plurality of available interfaces according to the one or more outputs and the selection logic, wherein the selection logic selects:
(a) a robust interface when the usage detection module indicates the below average user level state;
(b) a specialized interface when the usage detection module indicates the advanced user level state; and
(c) a standard interface when the usage detection module indicates the average user level state; and
wherein the interface selection engine automatically switches the interface to the one of the plurality of available interfaces selected;
wherein:
(A) the system is operable to repeatedly select one of the plurality of available interfaces at least once during an interaction with the interactive voice response system;
(B) the system is operable to repeatedly automatically switch the interface to one of the plurality of available interfaces at least once during the interaction;
(C) initially automatically switching the interface to one of the plurality of available interfaces comprises automatically switching the interface from a first interface to a second interface;
(D) a repeated selection of one of the plurality of available interfaces comprises selecting a third interface from the plurality of available interfaces;
(E) a repeated automatically switching the interface to one of the plurality of available interfaces comprises switching from the second interface to the third interface during the interaction; and
(F) the first interface, the second interface and the third interface are each interfaces to the interactive voice response system which are presented to a caller during the interaction.

14. The system according to claim 13, wherein the user level is determined based on members selected from the group consisting of a time to reach a specified marker during the interaction, a time spent on one or more dialogs within a call script during the interaction, a number of failures during the interaction, one or more unspecified commands provided by the caller, one or more terse responses provided by the caller, and combinations thereof.

15. The system according to claim 13 operable with a multimodal interface system.

16. A method in a computer system for selecting an interface presented to a caller during an interaction between the caller and an interactive voice response system, wherein the method comprises the steps of:
  (a) determining one or more outputs associated with the interaction, wherein the one or more outputs include a usage level;
  (b) selecting one of a plurality of available interfaces according to the one or more outputs associated with the interaction; and
  (c) switching the interface presented to the caller to the one of the plurality of available interfaces selected, wherein the switching occurs automatically during the interaction, and is based on the one or more outputs; and
  wherein:
  (i) steps (a) through (c) are repeated at least once during the interaction;
  (ii) initial step (c) comprises switching the interface presented to the caller from a first interface to a second interface;
  (iii) repeated step (b) comprises selecting a third interface from the plurality of available interfaces; and
  (iv) repeated step (c) comprises switching from the second interface to the third interface automatically during the interaction
  (v) the first interface, the second interface and the third interface are each interfaces to the interactive voice response system.

17. The method of claim 16, wherein the available interfaces include:
  (a) a standard interface; and
  (b) a specialized interface.

18. The method of claim 17, wherein the available interfaces further include a robust interface.

19. The method of claim 16, wherein the user level is determined based on members selected from the group consisting of a time to reach a specified marker during the interaction, a time spent on one or more dialogs within a call script during the interaction, a number of failures during the interaction, one or more unspecified commands provided by the caller, one or more terse responses provided by the caller, and combinations thereof.

* * * * *